United States Patent [19]
Ur

[11] Patent Number: 6,072,871
[45] Date of Patent: *Jun. 6, 2000

[54] METHOD AND SYSTEM FOR IDENTIFYING THE SOURCE OF DOCUMENTS GENERATED BY SOFTWARE AND DOCUMENTS GENERATED THEREBY

[75] Inventor: Shmuel Ur, Sorashim Misgav, Israel

[73] Assignees: Leon H. Charney, New York, N.Y.; Shay H. Bushinsky, Israel; a part interest

[*] Notice: This patent is subject to a terminal disclaimer.

[21] Appl. No.: 08/728,282

[22] Filed: Oct. 8, 1996

Related U.S. Application Data

[63] Continuation-in-part of application No. 08/318,218, Oct. 5, 1994, Pat. No. 5,568,550.

[51] Int. Cl.[7] .................................................. H04L 9/00
[52] U.S. Cl. ........................................................ 380/51
[58] Field of Search .............................. 380/3, 4, 23, 25, 380/55, 51; 162/163

[56] References Cited

U.S. PATENT DOCUMENTS

| | | | |
|---|---|---|---|
| 4,184,700 | 1/1980 | Greenway | 283/6 |
| 4,504,084 | 3/1985 | Jauch | 283/94 |
| 4,504,357 | 3/1985 | Holbein et al. | 162/123 |
| 4,883,291 | 11/1989 | Robertson | 380/55 |
| 4,908,873 | 3/1990 | Philibert et al. | 380/51 |
| 5,031,214 | 7/1991 | Dziewit et al. | 380/23 |
| 5,080,479 | 1/1992 | Rosenberg | 352/92 |
| 5,134,669 | 7/1992 | Keogh et al. | 382/61 |
| 5,140,650 | 8/1992 | Casey et al. | 382/61 |
| 5,149,140 | 9/1992 | Mowry, Jr. et al. | 283/93 |
| 5,467,169 | 11/1995 | Morikawa | 355/201 |
| 5,530,759 | 6/1996 | Braudaway et al. | 380/54 |
| 5,568,550 | 10/1996 | Ur | 380/3 |

FOREIGN PATENT DOCUMENTS

| | | | |
|---|---|---|---|
| 0551016 | 7/1993 | European Pat. Off. | H04N 1/387 |
| 0651554A1 | 5/1995 | European Pat. Off. | H04N 1/21 |
| 0751475A2 | 1/1997 | European Pat. Off. | G06K 9/46 |
| 9520291 | 7/1995 | WIPO | H04N 1/32 |

OTHER PUBLICATIONS

"A Secure, Imperceptable yet Perceptually Salient, Spread Spectrum Watermark for Multimedia", Cox et al., XP 000613940, ISBN #0–7803–3268–7, pp. 192–197. (1996).
"Watermarking digital images for copyright protection", Ruanaidh et al., IPA95 Special Section, XP 000613938, IEE Proc–Vis. Image Signal Process, vol. 143, No. 4, Aug. 1996.
"Digital watermarking", Delaigle et al., XP 000604065, SPIE vol. 2659, pp. 99–110, Jun. 1996.

(List continued on next page.)

*Primary Examiner*—Salvatore Cangialosi
*Attorney, Agent, or Firm*—Richard V. Westerhoff; Eckert Seamans Cherin & Mellott, LLC

[57] ABSTRACT

Each copy of software, such as software used by a digital computer to create a document and the software used by printers, facsimile machines or digital copiers to produce or reproduce documents, is assigned a unique identifying code pattern which is printed on all documents produced with that software by a high resolution printer. The unique identifying code pattern is a plurality of spaced apart marks having a size no greater than about 150 dpi and preferably about 300 dpi, and is therefore, at best, barely noticeable to the human observer. The "invisible signature" permits detection of documents made by unauthorized copies of software or by unauthorized or improper use of authorized copies. Preferably, the unique identifying code is replicated multiple times over the document using an error correcting code to assure that at least one replication will be clear of matter selected for printing by the software. A high resolution scanner extracts and identifies the code patterns printed on the document. In systems where the software generates a print file for the high resolution printer, print commands for the pattern replications are interspersed with the other print commands making identification and removal of the commands very difficult and not worth the effort since the "invisible signature" does not prevent copying of the software or noticeably detract from the appearance of the finished document.

14 Claims, 4 Drawing Sheets

OTHER PUBLICATIONS

"Protecting ownership rights through digital watermarking", Berghel et al., XP 000621887, Internet Kiosk, Jul. 1996, pp. 101–103.

"The Data Embedding Method," Maxwell T. Sandford II et al., P.D. 1995, pp. 226–259, Document No. XP 000601271.

"A Digital Signature Scheme on a Document for MH Facsimile Transmission," Kiyoshi Tanaka et al., *Electronics and Communications in Japan*, Part 1, vol. 74, No. 8 (1991).

METHOD AND SYSTEM FOR IDENTIFYING THE SOURCE OF DOCUMENTS GENERATED BY SOFTWARE AND DOCUMENTS GENERATED THEREBY

CROSS REFERENCE TO RELATED APPLICATION

This application is a continuation-in-part of U.S. patent application Ser. No. 08/318,218, filed on Oct. 5, 1994, now U.S. Pat. No. 5,568,550.

BACKGROUND OF THE INVENTION

1. Field of the Invention

This invention relates to the identification of the source of documents through the incorporation of a unique identifying code barely visible to the unaided human eye on documents by software which creates or reproduces the document. Such software includes the software program which creates the document as well as software in a printer, facsimile machine or digital copier used to print the document. The invention relates to systems and methods for providing such protection as well as the documents produced thereby.

2. Background Information

Software piracy is one of the biggest problems facing the software industry. It is estimated that only about 40% (by value) of the software in the United States is legal. That is only about 40% of the software has been purchased. The remainder is copied from legal software. As low as this may sound, it is a higher percentage of any other country. In Britain the estimate is that only about 20% of the software is legal. The Far East and Russia are known as one diskette countries, meaning that almost no legal software exists. According to a recent estimate, the cost to the software industry of piracy is $10–12 Billion a year.

Present techniques for protecting software are principally directed toward making it more difficult to copy the software. However, there is considerable consumer resistance to this approach, and computer hackers take great pride in meeting the challenge of defeating the lock. Other approaches such as placing a "time bomb" in the program which is activated if a license fee is not timely paid are also not received favorably by purchasers and can lead to possible liability for destroying a user's data.

The software industry has recently tried to stem the tide of piracy through legal remedies. However, this is a costly and time-consuming approach, which generally requires access to the host computer, and could backfire if suspicions turn out to be unfounded. Generally, legal redress is only suitable for large scale piracy. There is also high interest in restricting or at least detecting unauthorized use of printers, copiers and facsimile machines.

There is a need, therefore, for an improved technique for protecting software from piracy.

There is a need for such a technique which does not require access to the host computer on which the software is run.

There is also a need for such a technique which is sufficiently secure that attempts to defeat it are discouraged.

There is an additional need for such a technique which allows identification of unauthorized software copies without noticeably affecting the performance of the software or even the ability to copy it, again, so that the incentive to by-pass the technique is minimized.

There is also a need for a technique for unobtrusively detecting unauthorized use of printers, copiers and facsimile machines.

SUMMARY OF THE INVENTION

These needs and others are satisfied by the invention which is directed to uniquely identifying each document by an essentially invisible, or at least unnoticeable, signature applied to the documents generated or reproduced using software. In particular, the signature which is basically invisible or barely visible but unnoticeable to the unaided human eye, is a unique identifying code pattern which is imprinted on the document by the software. The invention is designed to be used with a high resolution printer, which for the purposes of this application is defined as a printer having a resolution at least as great as about 150 dpi (dots per inch) and preferably at least as great as about 300 dpi (dots per inch). The unique identifying code pattern is made up of non-contiguous marks, preferably single dots, generated by such a high resolution printer, however, when printers with a higher resolution are used, each mark may comprise multiple adjacent dots as long as they collectively constitute a mark having a size no greater than about 150 dpi and preferably no greater than about 300 dpi.

The unique identifying code pattern is automatically applied to each document made by the software. Unauthorized copies of the software will also generate documents with the same unique identifying code pattern thereon. Printers commonly used today have at least 300 dpi resolution and some have resolutions of 600 or 1000 dpi. But even at 150 dpi, the non-contiguous marks constituting the invisible signature are barely visible and go unnoticed by the casual observer. Documents produced by software incorporating the invention, can be scanned with a high resolution scanner which extracts the unique identifying code pattern for identification. Documents produced by a party not having a licensed copy of the software thus can be traced.

The unique identifying code can be placed on the document in an area in which other matter will typically not appear. Preferably, however, multiple replications of the unique identifying code pattern are spaced across the document so that the likelihood is increased that the "invisible signature" will not be obscured by other matter printed on the document. Also, the signature should be imprinted using an error correcting code so that imperfections in the paper and "smears" of the printer will not affect it.

The invention embraces both a method and a system for printing a unique identifying code pattern on the document using a high resolution printer as well as the document generated. The software code generating the unique signature can be embedded in the software which generates the printed document and can thus be used to identify unauthorized copying of software. It can also be embedded in the operating system software of the digital computer used to create the document and in the software of printers, digital copiers and facsimile machines to unobtrusively detect unauthorized or improper use of such equipment. In a broader respect, the invention is directed to a method of identifying a medium used to generate an image by employing the medium to generate an image incorporating the unique identifying code pattern, and scanning the image to extract and identify that pattern.

In accordance with another aspect of the invention, the use of a software copy can be controlled by embedding in the software a unique identifying code pattern which includes a resettable indicator. Also embedded in the software is means for resetting the resettable indicator. Printed documents are then generated containing the unique identifying code pattern including the resettable indicator. The documents can be scanned to extract the code pattern including the resettable indicator. The resettable indicator can be an install indicator indicating the cumulative number of times that the software has been installed. The install indicator is incremented each time the software copy is installed and decremented each time it is uninstalled. Alternatively, the resettable indicator is an authorization indicator which initially indicates unauthorized use. Means responsive to entry of an authorized code is embedded in the software to reset the unique identifying code pattern to indicate that the document generated using the software copy is authorized.

While the invention is only applicable to a medium which generates an image, such as software which generates, prints or reproduces a document, it has many advantages over present techniques. It does not require access to the equipment which generated the document or image. It does not prevent full use, or even copying, of the software or medium. Preferably, in software which generates a print file containing commands for the printer, print commands for the unique identifying code pattern are interspersed in the print file which makes it very arduous and time-consuming to attempt to extract those commands. The incentive is clearly to discourage attempts to defeat the system which leaves the user of an unauthorized copy open to detection.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
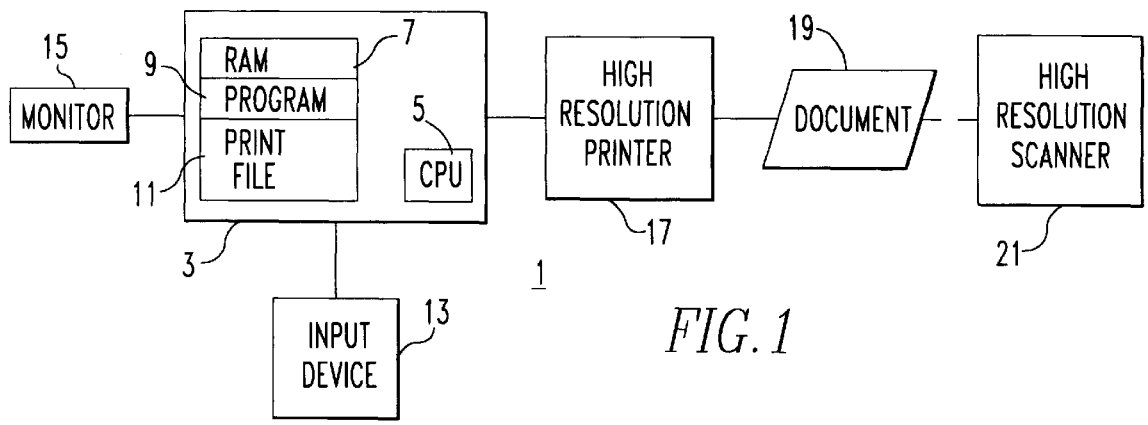
FIG. 1 is a schematic diagram in block form of a system for implementing the invention.

The invention will first be described as applied to protecting software, for which it is particularly suitable. The software is application software utilized in the computerized document production system 1 illustrated in FIG. 1. This system includes a digital computer 3 which includes a central processing unit (CPU) 5 and random access memory (RAM) 7 which stores the software program 9 for use by the CPU 5, and a print file 11. The CPU 5 implements the program 9 in accordance with instructions entered by the user through an input device 13 which can include one or more of a keyboard, a mouse, a track ball or a touch screen, for instance. The program 9 to which the invention applies has the capability of generating a printed document. This can be in addition to a display generated on a monitor 15. In fact, it is not necessary that the program always generate a document, but only that it is capable of generating a printed document. A high resolution printer 17 generates the document 19 by imprinting the information provided to it by the computer 3 on a substrate 20. Typically, the computer generates the print file 11 which contains detailed commands to the printer of the matter to be printed on the document 19. This matter could be text, numeric, alphanumeric, a pictorial image or any other matter. By high resolution printer, is meant that the printer has resolution of at least 150 dots per inch (dpi), but preferably 300 dpi. Currently available laser printers have at least this resolution and are also available with resolutions of 600 dpi and 1000 dpi. Also, it is not necessary that the computer generate a print file 11 for transmittal to the high resolution printer. Where the printer has its own software for generating the print instructions, the computer need only send to the printer the information to be printed.

As will be discussed in more detail, embedded in the printed document is a unique identifying code pattern assigned to the particular authorized copy of the software. The identity of the authorized owner can be recorded at the time of purchase of the software, or incentives can be provided to the purchaser to register the software after purchase such as by offering updates to the program only to those who register their name and address. The unique identifying code pattern is in essence a serial number or identifier for the authorized copy which becomes an invisible signature on the printed document 19.

While this "invisible signature" is not readily apparent to the casual observer of the document, and indeed with very high resolution printers may be imperceptible, the unique identifying code pattern can be extracted from the document 19 by a high resolution scanner 21. Such a scanner must have a resolution of at least as great as that of the printer. Scanners with such resolution are readily available, and in fact there are commercial models with resolutions as high as 2400 dpi. Of course, with the signature imprinted at a lower resolution, such as at 150 dpi, a less expensive scanner can be used to read the signature.

Figure 2A:
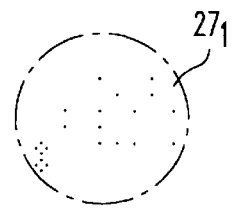
FIG. 2A is an enlargement of a section of FIG. 2.
Figure 2:
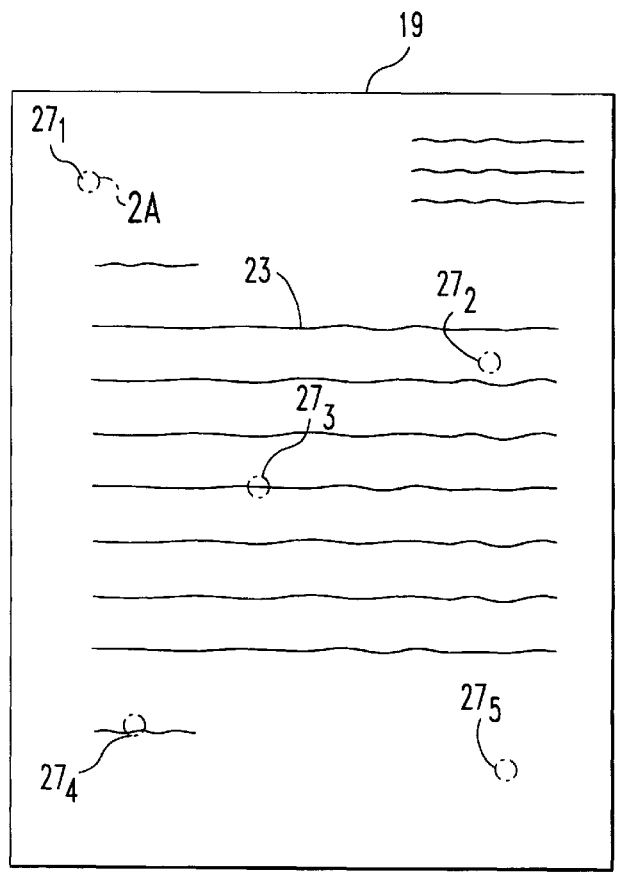
FIG. 2 is an illustration of a document generated by the system of FIG. 1 and incorporating a unique identifying code in accordance with the invention.

FIG. 2 illustrates a document 19 generated by the system of FIG. 1 in accordance with the invention. The exemplary document 19 is a printed document with lines of text 23 surrounded by clear margins 25. The unique identifying code pattern 27 is printed on the document simultaneously with the text 23. A single pattern $27_1$ can be printed at a location where it will be clear of the text 23. However, where the program prints selected matter other than printed text, such as, for example an image, there is no guarantee that any area on the document will always be free of selected matter 23. Therefore, it is preferred that multiple replications $27_1$–$27_5$ be printed at spaced apart locations across the face of the document 19. The number of replications shown in FIG. 2 and their locations are exemplary only. It is within the contemplation of the invention that a wide variety of the number of replications and their locations could be utilized. The selection of the number of replications and their locations could also be a function of the particular application program, with the selection being made to maximize the number of replications likely to appear in clear space on the document. As can be seen in FIG. 2, some of the replications of the unique identifying code pattern such as $27_1$ and $27_5$ appear in the margins. Others such as $27_2$ appear in the field of the printed text but between lines so that they are not obscured by the text. Still others such as $27_3$ and $27_4$ are at least partially obscured by the matter 23 selected by the program for the image to be generated on the document.

The replication 27₁ of the unique identifying pattern is shown magnified in FIG. 2A to illustrate that it is composed of a pattern of non-contiguous marks 29 each having a resolution at least as great as 150 and preferably 300 dpi. Where the printer 17 is a 150 or 300 dpi printer, each of the marks 29 is a single dot. If a higher resolution printer is used, for instance, a 1000 dpi printer, each of the marks 29 may be formed by adjacent dots, just so that collectively they have a resolution at least as great as 150 or 300 dpi. Thus, for instance, for a 1000 dpi printer each of the marks 29 could be 1, 2, or 3 dots. Preferably, however, single dots with a higher resolution printer are used, such as, for example single dots at 1000 dpi, so that the unique identifying code pattern 27 is imperceptible to the human eye, but can be read by a scanner 21 with at least a 1000 dpi resolution. On the other hand, a less expensive scanner can be used when the resolution of the marks comprising the unique identifying code are not as great.

Figure 3:
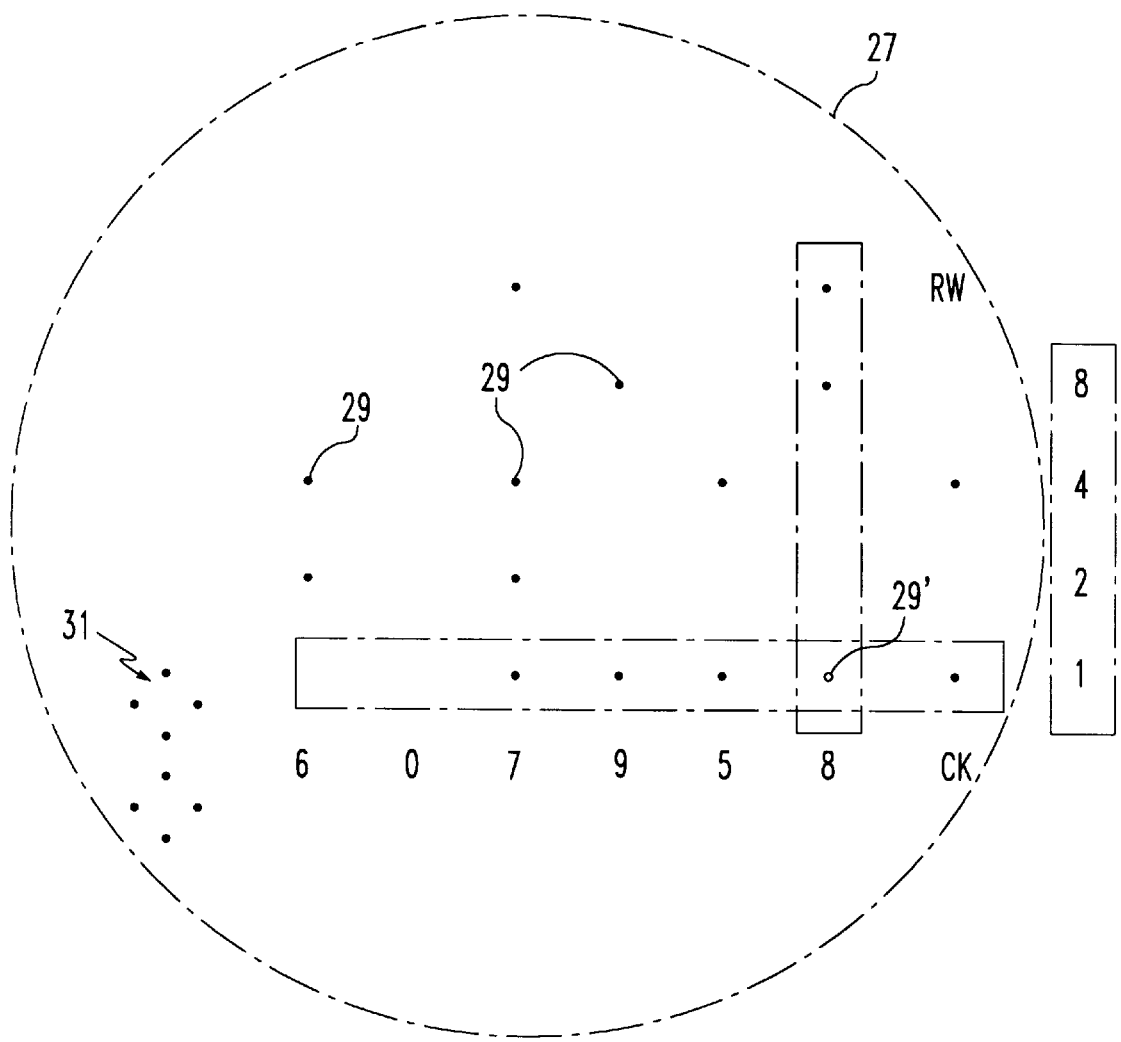
FIG. 3 is an example of a code which can be imprinted on the document of FIG. 2 by the system of FIG. 1 in accordance with the invention.

While any code pattern could be utilized, the exemplary unique identifying code 27 is a series of binary coded decimal numbers. For example, as shown in FIG. 3 such binary coded decimal numbers can be represented in columns having rows indicating by dots the powers of 2 which make up the number represented by that column. Thus, for the representative number 607958, the six is represented by the left most column with dots 29 in the two row and four row. An odd parity check sum column, CK, to the right of the least significant number provides a measure of reliability in reading the code. Preferably, a error correcting code can be used.

An example of a simple error correcting code is shown in FIG. 3. In addition to the odd parity check sum column, CK, an odd parity check sum row, RW, can also be provided in the unique identifying code pattern. Assume for purposes of illustration that the detected pattern has an error in that a dot 29' is erroneously detected in the first power of two row for the right hand column so that the detected least significant digit is 9 rather than 8. In this instance, the first power of two row odd parity check computed by the scanner from the detected pattern will not agree with that printed in the detected pattern. In addition, the parity check for the right-hand column will also not check in that a dot is found in the right-hand column odd parity check while the detected dot pattern would predict a 0 in this column. Hence, the row and column parity bits which intersect at the first power of two location in the least significant bit indicate that this dot 29' is an error and should not be there. Thus, the scanner can correct the detected code. If multiple dots are in error, such as could occur if the unique identifying code pattern overlaps printed matter selected by the program, it may not be possible to correct the code. However, with the multiple replications of the code, similarities between detected patterns can be used to verify the code. In its simplest form, if two patterns are the same, the code is verified.

If the replications 27 of the unique identifying code are always placed in the same location on the document, the scanner 21 can be programmed to interrogate those locations. However, if the locations of the unique identifying code 27 are random, or vary with different manufacturers or programs, each replication of the code can be preceded by a marker such as the symbol 31 shown in FIG. 3 to indicate to the scanner the beginning of a replication of the unique identifying code pattern. Of course, any other symbol can be used as the marker to indicate the location of the unique identifying code patterns.

Figure 4:
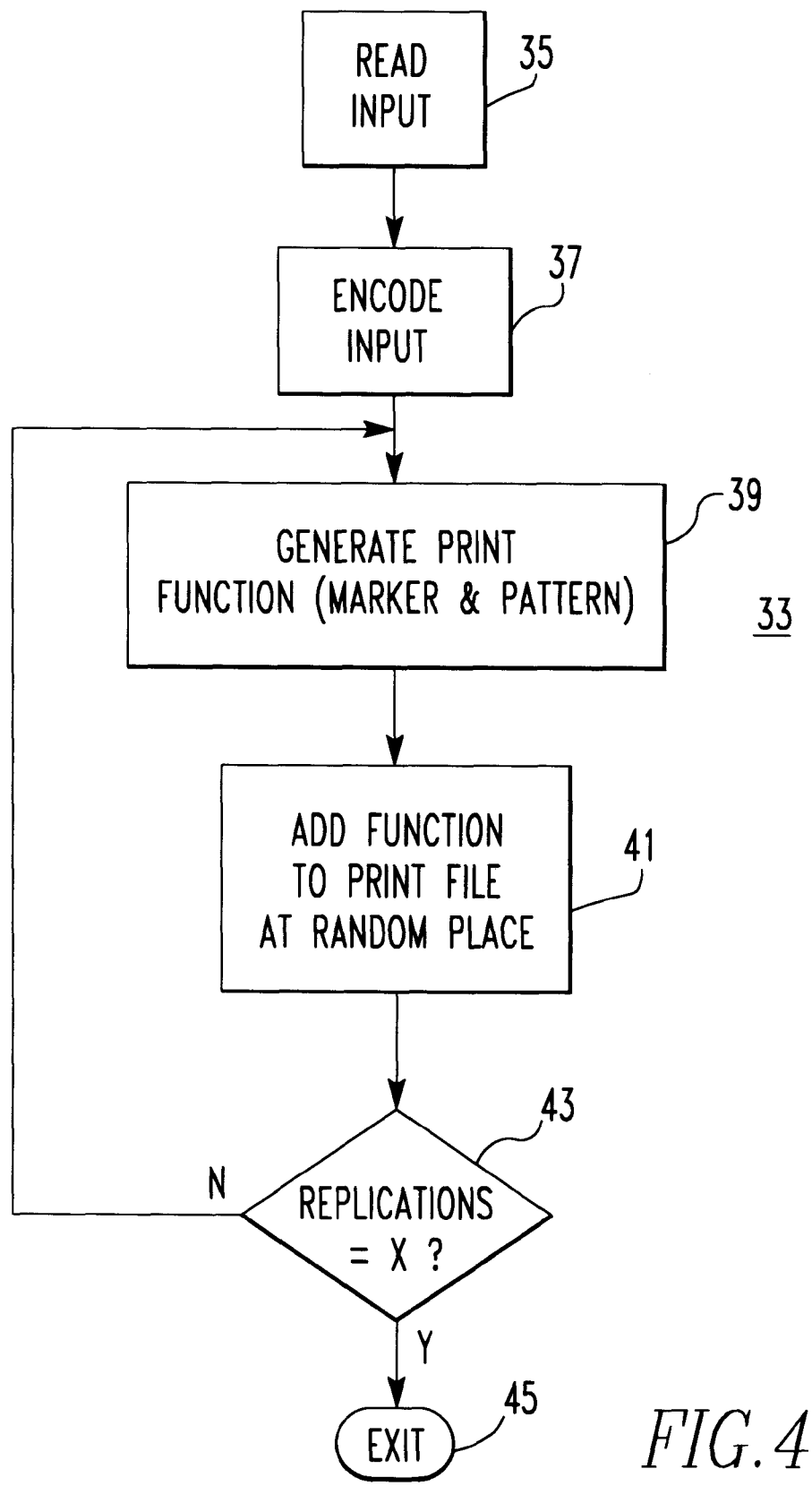
FIG. 4 is a flow chart of a routine used to generate a print file used by the system of FIG. 1 in accordance with the invention.

The unique identifying code pattern 27 with the marker 31, if provided, is placed in the print file by a routine 33 such as that illustrated by the flow chart of FIG. 4. The routine reads the input of the "invisible signature" at 35. For instance, in the pattern illustrated in FIG. 3 the program would read the number "607,958". The signature is then encoded, for instance in binary coded decimal, at 37. A print function for the binary coded decimal pattern plus the marker (such as 31 shown in FIG. 3) is then generated at 39. This print function contains commands, for instance in the postscript language where the print file is in postscript, telling the printer how to print the desired pattern and marker. Each time the print file is generated by the software for printing a document, the print function generated at 39 is inserted into the print file. In the exemplary routine, the unique identifying code pattern is inserted at random into the print file. While this command is inserted at random into the print file it could be printed at a fixed location in the document depending upon the command. The printer when reading the print file sorts out the various commands and arranges them in order for printing on the document. In the example, multiple replications of the unique identifying code pattern 27 are inserted in the document, hence, the routine loops back at 43 until all replications have been inserted into the print file. The routine is then exited at 45.

The unique identifying code pattern or "invisible signature" can be added to any document produced by a specific software. This will make it possible to detect the particular software copy that produced the document by checking the hard copy itself. As access to a document should be much easier than to the computer on which the software produced it resides, it will become easier to identify software pirates. If a producer of software suspects that someone has an unauthorized copy of its software, it could send an inquiry to the user which would require a response using the software, such as, for example a letter. The letter could then be scanned with a high resolution scanner to extract the unique identifying code pattern which could then be checked against the registered owner of that copy of the software. If the sender of the document is not the registered owner, then an investigation could be made into how the user gained access to the program copy used. The invisible signature will be reproduced by copying of the document using a copier of reasonable quality. In fact, depending upon the quality of the copier, even copies of the copies should retain the signature. After several generations of copies on a good printer or even the first copy of a printer with poor resolution, the "invisible signature" will probably be degraded to the point that it could not be extracted by scanner, but then again, the overall quality of the document will also be seriously degraded.

In addition to being used by sellers of software to detect unauthorized copies, the invention could also be used by the owner of the copy to detect unauthorized use of the owner's facilities or the source of threatening or harassing messages. Thus, the invention can also be used to determine the source of a document even if that source is legal.

Figure 5:
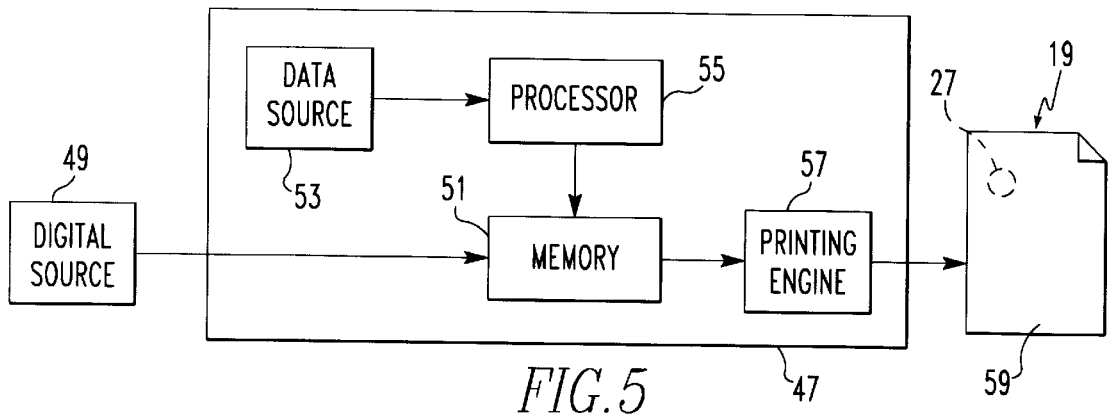
FIG. 5 illustrates implementation of the invention in a printer.

In this regard, the invention can also be used with other components of the system which generate a document. For instance, as shown in FIG. 5, the invention can be used with a printer 47. Graphical or printed information from a digital source such as a computer and so forth 49 is placed in memory 51 of the printer. The unique signature which could include identification data such as time, serial number of the printer, sequential number of page, and so forth is retrieved from a data source 53 and is converted into a collection of non-contiguous marks and then superimposed upon the graphical image in the memory 51 by a processor 55. The integrated image that contains both the graphics and the invisible signature is then sent to a printing engine 57 and is printed on a substrate 59 to generate the document 19 incorporating at least one replication of the unique identifying code pattern 27.

Figure 6:
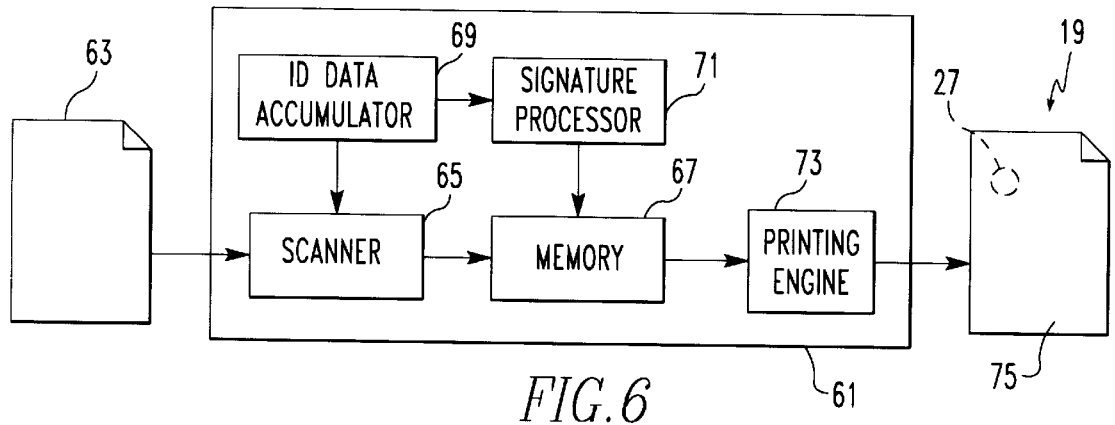
FIG. 6 illustrates implementation of the invention in a digital copier.

The invention can also be used with a digital copier 61 as shown in FIG. 6. An original document 63 is scanned by a scanner 65 which digitizes the image and stores it in a memory 67. The identification data for the unique identifying code is read from an identification data accumulator 69 by a signature processor 71 and is converted to a bit map containing a collection of points. The digital image of the signature is then superimposed upon the image in memory 67, and the integrated image is then imprinted by the printing engine 73 onto the substrate 75 to form the document 19 with at least one replication of the unique identifying code pattern 27.

Figure 7:
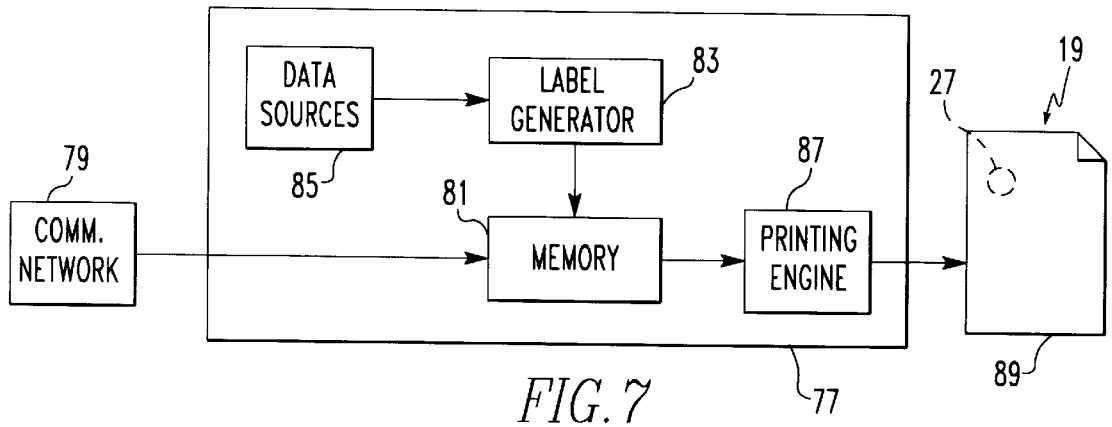
FIG. 7 illustrates implementation of the invention in a facsimile machine.

Another application of the invention is to identify a facsimile machine such as the receiving facsimile machine 77 shown in FIG. 7. The receiving facsimile machine 77 receives an image-bearing electrical signal over a communications network 79 and digitally stores it in memory 81. A label generator 83 takes identifying information for the unique identifying code such as time, serial number of the machine, and local header information from various data sources 85 in the machine and processes it into a label, or a multitude of labels. These labels are then superimposed on the received image in memory 81, and are then sent to the facsimile printing engine 87 for printing on the substrate 89 which becomes the document 19 with at least one replication of the unique identifying code pattern 27.

Thus, it can be seen that the invention is useful in identifying the source of a document. This can encompass identification of the equipment on which the document was prepared where the equipment utilizes software to prepare or reproduce a document. This includes not only embedding code to generate the invisible signature in the software or firmware of the printers, digital copiers and facsimile machines, but also embedding it either in application software or in the operating system software of a digital computer to identify that computer as the source of documents. The invention can also detect unauthorized copies of software. This applies not only to application software used in a digital computer to generate a document, but can include proprietary software used in equipment such as printers, fax machines and digital copiers.

The invention can also be used to control use of a software copy. The unique identifying code pattern can include a resettable indicator. Also embedded in the software is code for resetting the resettable indicator. This resettable indicator can indicate for instance a cumulative number of times that the software copy has been installed. The install indicator is incremented each time the software is installed. In addition, the install indicator is decremented each time the software is uninstalled. Alternatively, the resettable indicator is an authorization indicator indicating unauthorized use. The authorization indicator is reset to indicate that a document generated by the software is authorized.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A document comprising: a substrate; and an identifying pattern of marks applied to said substrate comprising a plurality of non-contiguous marks each having a size no greater than about 150 dpi applied to said substrate.

2. The document of claim 1 wherein said identifying pattern of marks applied to said substrate comprises a plurality of non-contiguous marks each having a size no greater than about 300 dpi applied to said substrate.

3. The document of claim 1 wherein replications of said pattern of marks are repeated across said substrate.

4. The document of claim 3 wherein said substrate includes printed matter thereon and wherein at least some of said replications of said pattern of marks are interspersed with said printed matter.

5. The document of claim 4 wherein each of said plurality of non-contiguous marks has a size no greater than about 300 dpi.

6. A system for identifying a document comprising:
    means applying to said document at least one replication of a unique identifying code pattern comprising a plurality of non-contiguous marks each having a size no greater than about 150 dpi; and
    reader means for extracting from said document said unique identifying code.

7. The system of claim 6 wherein said means for applying said unique identifying code comprises printer means having processing means incorporating said at least one replication of said unique identifying code pattern into matter to be printed on said document and means applying said matter to be printed incorporating said unique identifying code to said document.

8. The system of claim 6 wherein said means applying said unique identifying code pattern comprises a digital computer incorporating means generating a print file containing said unique pattern comprising a plurality of non-contiguous marks and additional matter to be applied to said document, and printer means applying contents of said print file including said at least one replication of said unique identifying code pattern to said document.

9. The system of claim 6 wherein said means applying said unique identifying code pattern comprising a plurality of non-contiguous marks comprises a digital copier including means applying the matter copied from an original and incorporating said at least one replication of said unique identifying code pattern to said document.

10. The system of claim 6 wherein said means applying said unique identifying code pattern comprising a plurality of non-contiguous marks comprises a facsimile machine including means generating a digital file representing matter copied from an original and means incorporating into said digital file at least one replication of said unique identifying code pattern.

11. A method of controlling use of a software copy used to generate documents comprising the steps of:
    embedding in said software copy a unique identifying code pattern to be printed in addition to matter selected for printing by said software copy, said unique identifying code pattern including a resettable indicator, said embedding further including embedding in said software means for resetting said resettable indicator;

generating printed documents containing said unique identifying code pattern including said resettable indicator and said matter selected for printing by said software copy, said unique identifying code pattern comprising a plurality of non-contiguous marks each of a size no greater than about 150 dpi; and scanning said documents to extract and identify said unique identifying code pattern including said resettable indicator.

12. The method of claim 11 wherein said step of embedding comprises embedding said unique identifying code pattern with an install indicator indicating a cumulative number of times said software copy has been installed as said resettable indicator and wherein said further embedding comprises embedding means for incrementing said install indicator each time said software copy is installed.

13. The method of claim 12 wherein said step of further embedding comprises embedding means decrementing said install indicator each time said software is uninstalled.

14. The method of claim 11 wherein said step of embedding comprises embedding said unique identifying code pattern with said resettable indicator comprising an authorization indicator initially indicating unauthorized use, and wherein embedding said means for resetting comprises embedding means responsive to entry of an authorized code for resetting said authorization indicator to generate a unique identifying code pattern indicating that the document generated using the software copy is authorized.

* * * * *